(12) United States Patent
Mattmann et al.

(10) Patent No.: US 8,546,468 B2
(45) Date of Patent: Oct. 1, 2013

(54) METHOD AND DEVICE FOR THE CONTINUOUS PRODUCTION OF POLYMERS BY RADICAL POLYMERIZATION

(75) Inventors: Wolfgang Mattmann, Limburgerhof (DE); Wolfgang Loth, Bad Duerkheim (DE); Bolette Urtel, Bobenheim-Roxheim (DE); Elke Guetlich-Hauk, Lambsheim (DE); Christian Hubert Weidl, Speyer (DE); Andreas Daisse, Deidesheim (DE)

(73) Assignee: BASF SE, Ludwigshafen (DE)

( * ) Notice: Subject to any disclaimer, the term of this patent is extended or adjusted under 35 U.S.C. 154(b) by 168 days.

(21) Appl. No.: 12/990,734

(22) PCT Filed: Apr. 30, 2009

(86) PCT No.: PCT/EP2009/055296
§ 371 (c)(1),
(2), (4) Date: Nov. 2, 2010

(87) PCT Pub. No.: WO2009/133186
PCT Pub. Date: Nov. 5, 2009

(65) Prior Publication Data
US 2011/0054071 A1 Mar. 3, 2011

(30) Foreign Application Priority Data
May 2, 2008 (EP) .................................. 08155607

(51) Int. Cl.
*C08J 3/20* (2006.01)
(52) U.S. Cl.
USPC .......................................... 523/351; 422/131
(58) Field of Classification Search
USPC ......................................... 523/351; 422/131
See application file for complete search history.

(56) References Cited

U.S. PATENT DOCUMENTS

| 5,886,112 A | 3/1999 | Vuillemin et al. |
| 6,492,471 B1 | 12/2002 | Eisenbeiss et al. |
| 6,555,629 B1 * | 4/2003 | Pysall et al. ................... 526/64 |
| 2006/0241242 A1 | 10/2006 | Devlin et al. |
| 2009/0203874 A1 | 8/2009 | Loffler et al. |
| 2009/0315204 A1 | 12/2009 | Losch et al. |
| 2010/0041914 A1 | 2/2010 | Woelfert et al. |
| 2010/0056822 A1 | 3/2010 | Daiss et al. |
| 2010/0076218 A1 | 3/2010 | Daiss et al. |
| 2010/0185032 A1 | 7/2010 | Iselborn et al. |
| 2010/0210870 A1 | 8/2010 | Olbert et al. |
| 2010/0293842 A1 | 11/2010 | Kasel et al. |
| 2010/0305356 A1 | 12/2010 | Olbert et al. |
| 2011/0028666 A1 | 2/2011 | Mattmann et al. |

FOREIGN PATENT DOCUMENTS

| DE | 19816886 | 10/1999 |
| DE | 19920794 A1 | 11/2000 |
| WO | WO-99/54362 A1 | 10/1999 |
| WO | WO-03/037501 A1 | 5/2003 |
| WO | WO-2007/135154 A1 | 11/2007 |
| WO | WO-2008/055898 A1 | 5/2008 |
| WO | WO-2008/055899 A1 | 5/2008 |
| WO | WO-2008/055904 A1 | 5/2008 |
| WO | WO-2008/086976 A1 | 7/2008 |
| WO | WO-2008/155399 A1 | 12/2008 |
| WO | WO-2009/027232 A1 | 3/2009 |
| WO | WO-2009/027234 A1 | 3/2009 |
| WO | WO-2009/092730 A1 | 7/2009 |
| WO | WO-2009/133186 A1 | 11/2009 |
| WO | WO-2009/133187 A1 | 11/2009 |

OTHER PUBLICATIONS

Office Action from corresponding Russian Application No. 2010149026 dated Mar. 12, 2013.

* cited by examiner

*Primary Examiner* — Edward Cain
(74) *Attorney, Agent, or Firm* — Novak Druce Connolly Bove + Quigg LLP

(57) ABSTRACT

The present invention relates to a method for the continuous production of a polymer by radical polymerization, wherein at least three materials are mixed with microstructures in one or more mixers and are then polymerized in at least one reaction zone.

19 Claims, 1 Drawing Sheet

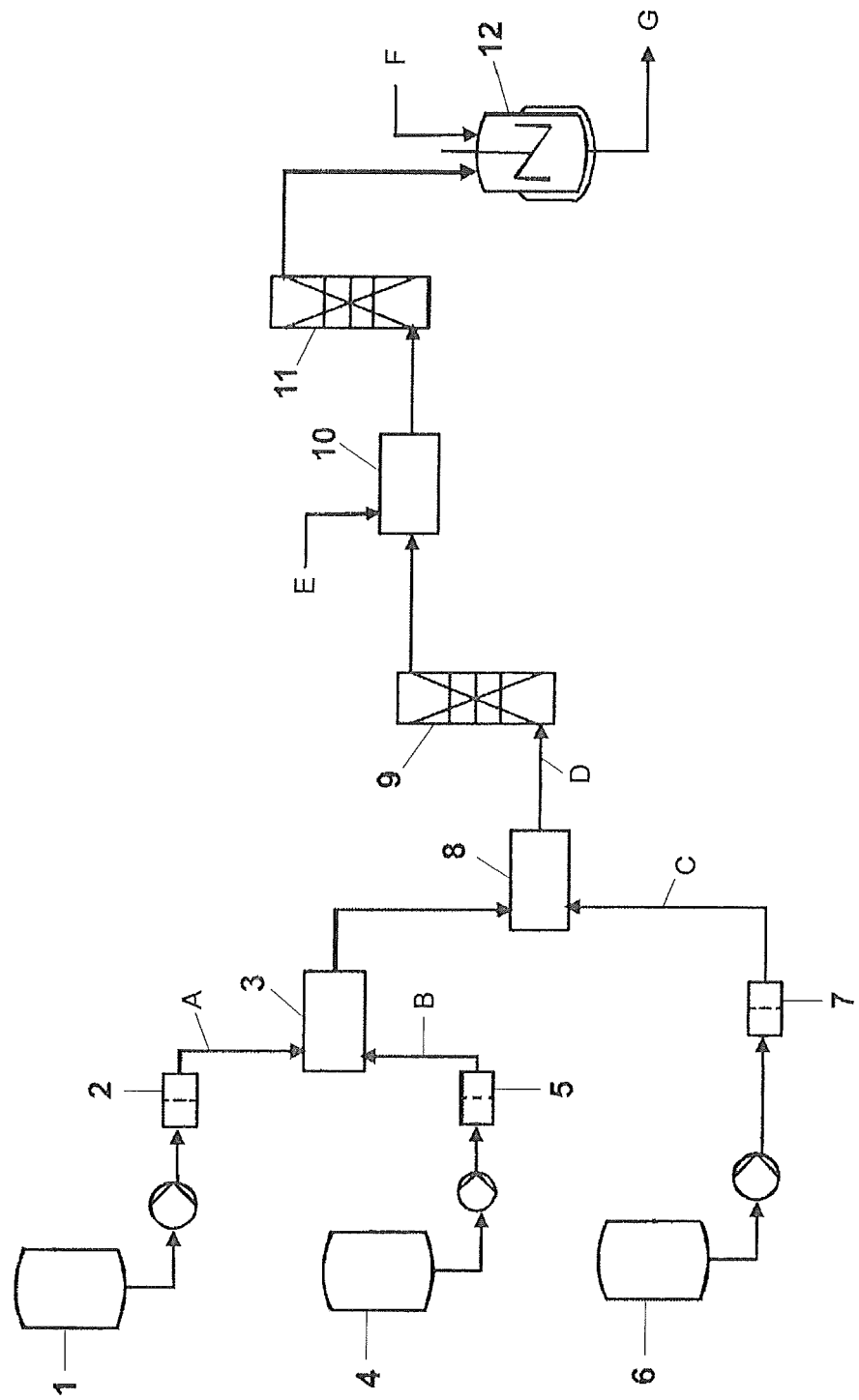

METHOD AND DEVICE FOR THE CONTINUOUS PRODUCTION OF POLYMERS BY RADICAL POLYMERIZATION

PRIORITY

Priority is claimed as a national stage application, under 35 U.S.C. §371, to PCT/EP2009/055296, filed Apr. 30, 2009, which claims priority to European application 08155607.8, filed May 2, 2008. The disclosures of the aforementioned priority applications are incorporated herein by reference in their entirety.

The present invention relates to a process for continuously preparing a polymer by free-radical polymerization, in which at least three feedstocks are mixed in one or more mixers with microstructures and then polymerized in at least one reaction zone.

WO 99/54362 describes a process for continuously preparing polymers, in which at least two reactants are conducted through and combined by a micromixer, mixed with one another and then polymerized in a tubular reactor. In this case, the starting materials are preheated to such an extent that they reach the required reaction temperature after entering the micromixer. This procedure is intended to prevent the formation of polymers with a bimodal molar mass distribution and high molecular weight fractions which can lead to blockage or coverage of the reactor system. Not only is this procedure energy-intensive, but an undefined preliminary conversion in the mixer also has to be expected. In addition, in the case of monomers containing acid groups and at the high reaction temperatures as are required for preparation of low molecular weight products, an increased degree of corrosion problems occurs. Moreover, even a brief stoppage in a feed or a decline in the flow can already result in polymerization in the mixer owing to the preheating, and hence also in blockage of the micromixer.

WO 03/037501 discloses a process for (co)polymerizing olefinically unsaturated monomers, in which at least two starting materials in the form of two liquid streams in opposite directions are mixed in a mixer with intermeshing microchannels before they enter a reaction vessel. Owing to the channel dimensions used with cross sections in the range from 10 to 100 μm, there is the risk of coverage or blockage of mixer and/or reactor in this process too. This is problematic since apparatus with microstructures is generally also not very accessible for cleaning purposes.

BRIEF DESCRIPTION OF THE DRAWING

FIG. 1 illustrates an embodiment of an apparatus and a process according to the invention.

It is thus an object of the present invention to provide a process for the continuous preparation of free-radical polymers, such that the disadvantages known from the prior art are avoided. The process should especially enable the preparation of solution polymers with a defined, very narrow molar mass distribution, be energy-efficient, i.e. make preheating obsolete, proceed in an apparatus which does not include any risk of blockage for the micromixer and/or the reactor, and/or as far as possible avoid corrosion problems in the case of use of monomers containing acid groups. Extremely expensive specialty materials should especially be dispensed with.

This object is achieved in accordance with the invention by a process for continuously preparing a polymer by free-radical polymerization, comprising the following steps:

(a) providing at least two liquid streams, said at least two liquid streams each comprising one or more of the following components:
    a free-radically polymerizable monomer,
    a regulator selected from solvents which act as regulators and regulators different therefrom, and
    an initiator,
    with the proviso that the stream comprising the initiator does not also comprise the regulator,
(b) mixing said at least two liquid streams to obtain a reaction mixture using at least one mixer with microstructures, and
(c) free-radically polymerizing the reaction mixture obtained in step (b) in at least one reaction zone.

In the context of the present invention, the expression "liquid stream" refers to the stream itself and not to the state of matter of each individual component of the stream. In other words, when one of the components is not in the liquid state under the given pressure and temperature conditions of steps (a), (b) and (c), it may be present dissolved in a solvent. In the context of the present invention, a liquid stream is understood to mean either a substance present in liquid form under the given pressure and temperature conditions or a melt or a solid dissolved in a liquid solvent.

In a suitable embodiment, the following streams are provided in step (a):
(1) at least one liquid stream which comprises at least one free-radically polymerizable monomer,
(2) at least one liquid stream which comprises at least one initiator, and
(3) at least one liquid stream which comprises at least one regulator.

In the case of the latter configuration too, the proviso applies that the stream comprising the initiator does not also comprise the regulator (and hence also does not comprise a solvent active as a regulator).

In a suitable embodiment, the free radical polymerization in step (c) is effected by using at least one microstructured reaction zone.

In a particularly preferred embodiment, the liquid streams are mixed below the reaction temperature of the subsequent polymerization. More particularly, the liquid streams are mixed without preheating. Preference is then given to effecting the mixing at ambient temperature (23° C.) or lower, for example in the range from 10° C. to 30° C. More preferably, the mixing is effected below the reaction temperature, for example at least 10° C., at least 15° C. or at least 20° C. below the reaction temperature. The reaction temperature is defined as the temperature at which the polymerization is carried out in the reaction zone. When it is a temperature range, what is meant is the lowest temperature established in the reaction zone. This allows premature initiation of the reaction mixture during the mixing operation to be avoided and a defined start of the reaction and defined residence times in the subsequent polymerization to be obtained. Furthermore, this process prevents polymer formation caused by uncontrolled reaction and blockage of mixing and reaction apparatus.

In a first preferred embodiment, the liquid streams are mixed in one stage in a mixer with microstructures.

In another preferred embodiment, the liquid streams are mixed in more than one stage, in which case at least the last mixer in flow direction before entry into the reaction zone(s) is a mixer with microstructures.

In a further preferred embodiment, the product of heat transfer coefficient and volume-specific heat transfer area in the at least one reaction zone is greater than 12500 W/m³K, preferably greater than 50000 W/m³K, more preferably greater than 200000 W/m³K and especially greater than 800000 W/m³K.

The polymerization can be effected in one stage or in two or more than two stages, i.e. in 2, 3, 4, 5 or more stages.

In a suitable embodiment, in the case of a multistage polymerization, at least one additional stream (for example one, two, three, four or five streams) is added between at least two of the polymerization stages. This may be a monomer-containing stream, initiator-containing stream, solvent-containing stream, regulator-containing stream, a mixture thereof and/or any other stream.

In a suitable embodiment, the additional stream(s) is/are mixed in by means of a mixer with microstructures. In a likewise suitable embodiment, at least one reactor with a mixing function is used to mix the additional stream(s) and for the further reaction.

In a further suitable embodiment, the reaction discharge is subjected to an aftertreatment. This is selected from postpolymerization, deodorization, neutralization, an additization different therefrom and combinations thereof.

In another suitable embodiment, at least one additive is added to the reaction discharge. In a specific embodiment, the aftertreatment is effected by mixing at least one additive with the reaction discharge using a mixer with microstructures.

The free-radical polymerization is preferably effected as a solution polymerization or bulk polymerization. Particular preference is given to solution polymerization.

In a particularly suitable embodiment, the polymerization is effected by using as a monomer a monoethylenically unsaturated carboxylic acid or sulfonic acid or a monomer mixture which comprises at least one monoethylenically unsaturated carboxylic acid or sulfonic acid.

The present invention further provides an apparatus for continuously preparing polymers, comprising at least two reservoir vessels for liquid starting materials,
one feed each for the liquid streams from the at least two reservoir vessels,
one or more mixers connected in series, to which the liquid streams are supplied and in which they are mixed to obtain a reaction mixture, at least the last mixer in flow direction before entry into the reaction zone(s) being equipped with microstructures,
at least one microstructured reaction zone, and
a discharge vessel which is optionally equipped with one or more addition and/or mixing devices.

In an alternative embodiment, this apparatus comprises
at least three reservoir vessels for liquid starting materials,
one feed each for the liquid streams from the at least three reservoir vessels,
one or more mixers connected in series, to which the liquid streams are supplied and in which they are mixed to obtain a reaction mixture, at least the last mixer in flow direction before entry into the reaction zone(s) being equipped with microstructures,
at least one reaction zone, and
a discharge vessel which is optionally equipped with one or more addition and/or mixing devices.

In a suitable embodiment of the apparatus, at least one microstructured reaction zone is used.

In another suitable embodiment, the apparatus comprises two reaction zones.

In a likewise suitable embodiment, the apparatus has at least one further feed for a liquid monomer stream which is arranged downstream of a reaction zone and which is followed in flow direction by at least one other reaction zone.

In a suitable configuration, this apparatus has at least one further feed for a liquid additive stream which is arranged downstream of the last reaction zone in flow direction.

In a further suitable configuration of this apparatus, the further liquid stream fed in and the discharge from the reaction zone to which the feed is connected on the downstream side are conducted into a mixer with microstructures and mixed therein.

The invention further provides for the use of the inventive apparatus for continuous preparation of a polymer by free-radical polymerization.

The use of a polymer obtained by the process according to the invention or in an inventive apparatus as a dispersant for pigments, as a component of a washing or cleaning product composition, in water treatment or as an additive in mineral oil extraction likewise forms part of the subject matter of the present invention.

Monomers

In the process according to the invention, at least one free-radically polymerizable α,β-ethylenically unsaturated monomer is used for the polymerization. Suitable monomers are selected from monoethylenically unsaturated carboxylic acids, sulfonic acids and phosphonic acids, esters of α,β-ethylenically unsaturated mono- and dicarboxylic acids with $C_1$-$C_{20}$-alkanols, vinylaromatics, esters of vinyl alcohol with $C_1$-$C_{30}$-monocarboxylic acids, ethylenically unsaturated nitriles, vinyl halides, vinylidene halides, esters of α,β-ethylenically unsaturated mono- and dicarboxylic acids with $C_2$-$C_{30}$-alkanediols, amides of α,β-ethylenically unsaturated mono- and dicarboxylic acids with $C_2$-$C_{30}$-amino alcohols which have a primary or secondary amino group, primary amides of α,β-ethylenically unsaturated monocarboxylic acids and the N-alkyl and N,N-dialkyl derivatives thereof, N-vinyllactams, open-chain N-vinylamide compounds, esters of allyl alcohol with $C_1$-$C_{30}$-monocarboxylic acids, esters of α,β-ethylenically unsaturated mono- and dicarboxylic acids with amino alcohols, amides of α,β-ethylenically unsaturated mono- and dicarboxylic acids with diamines which have at least one primary or secondary amino group, N,N-diallylamines, N,N-diallyl-N-alkylamines, vinyl- and allyl-substituted nitrogen heterocycles, vinyl ethers, $C_2$-$C_8$-monoolefins, nonaromatic hydrocarbons having at least two conjugated double bonds, polyether(meth)acrylates, monomers having urea groups and mixtures thereof.

Suitable ethylenically unsaturated carboxylic acids, sulfonic acids and phosphonic acids or derivatives thereof are acrylic acid, methacrylic acid, ethacrylic acid, α-chloro-acrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having from 4 to 10 and preferably from 4 to 6 carbon atoms, for example monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid and allylphosphonic acid. The monomers containing acid groups can be used for the polymerization in the form of the free acid or in partly or fully neutralized form. Suitable bases for the neutralization are, for example, KOH, NaOH, ammonia, etc. Particular preference is given to acrylic acid, methacrylic acid and salts and mixtures thereof.

Suitable esters of α,β-ethylenically unsaturated mono- and dicarboxylic acids with $C_1$-$C_{20}$-alkanols are methyl(meth)acrylate, methyl ethacrylate, ethyl(meth)acrylate, ethyl ethacrylate, n-propyl(meth)acrylate, isopropyl(meth)acrylate, n-butyl(meth)acrylate, sec-butyl(meth)acrylate, tert-butyl(meth)acrylate, tert-butyl ethacrylate, n-hexyl(meth)acrylate, n-heptyl(meth)acrylate, n-octyl(meth)acrylate, 1,1,3,3-tetramethylbutyl(meth)acrylate, ethylhexyl(meth)acrylate, n-nonyl(meth)acrylate, n-decyl(meth)acrylate, n-undecyl(meth)acrylate, tridecyl(meth)acrylate, myristyl(meth)acrylate, pentadecyl(meth)acrylate, palmityl(meth)acrylate, heptadecyl(meth)acrylate, nonadecyl(meth)acrylate, arachinyl(meth)acrylate, behenyl(meth)acrylate, lignoceryl(meth)acrylate, cerotinyl(meth)acrylate, melissinyl(meth)acrylate, palmitoleoyl(meth)acrylate, oleyl(meth)acrylate, linolyl(meth)acrylate, linolenyl(meth)acrylate, stearyl(meth)acrylate, lauryl(meth)acrylate and mixtures thereof.

Preferred vinylaromatics are styrene, 2-methylstyrene, 4-methylstyrene, 2-(n-butyl)styrene, 4-(n-butyl)styrene, 4-(n-decyl)styrene, and particular preference is given to styrene.

Suitable esters of vinyl alcohol with $C_1$-$C_{30}$-monocarboxylic acids are, for example, vinyl formate, vinyl acetate, vinyl propionate, vinyl butyrate, vinyl laurate, vinyl stearate, vinyl propionate, vinyl versatate and mixtures thereof.

Suitable ethylenically unsaturated nitriles are acrylonitrile, methacrylonitrile and mixtures thereof.

Suitable vinyl halides and vinylidene halides are vinyl chloride, vinylidene chloride, vinyl fluoride, vinylidene fluoride and mixtures thereof.

Suitable esters of $\alpha,\beta$-ethylenically unsaturated mono- and dicarboxylic acids with $C_2$-$C_{30}$-alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate etc.

Suitable primary amides of $\alpha,\beta$-ethylenically unsaturated monocarboxylic acids and the N-alkyl and N,N-dialkyl derivatives thereof are acrylamide, methacrylamide, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachinyl(meth)acrylamide, N-behenyl(meth)acrylamide, N-lignoceryl(meth)acrylamide, N-cerotinyl(meth)acrylamide, N-melissinyl(meth)acrylamide, N-palmitoleoyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, morpholinyl(meth)acrylamide.

Suitable N-vinyllactams and derivatives thereof are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide.

Suitable esters of $\alpha,\beta$-ethylenically unsaturated mono- and dicarboxylic acids with amino alcohols are N,N-dimethylaminomethyl(meth)acrylate, N,N-dimethylaminoethyl(meth)acrylate, N,N-diethylaminoethyl acrylate, N,N-dimethylaminopropyl(meth)acrylate, N,N-diethylaminopropyl(meth)acrylate and N,N-dimethylaminocyclohexyl(meth)acrylate.

Suitable amides of $\alpha,\beta$-ethylenically unsaturated mono- and dicarboxylic acids with diamines which have at least one primary or secondary amino group are N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide, N-[4-(dimethylamino)cyclohexyl]methacrylamide etc.

Suitable monomers are also N,N-diallylamines and N,N-diallyl-N-alkylamines and the acid addition salts and quaternization products thereof. Alkyl here is preferably $C_1$-$C_{24}$-alkyl. Preference is given to N,N-diallyl-N-methylamine and N,N-diallyl-N,N-dimethylammonium compounds, for example the chlorides and bromides.

Suitable monomers M) are also vinyl- and allyl-substituted nitrogen heterocycles, such as N-vinylimidazole, N-vinyl-2-methylimidazole, vinyl- and allyl-substituted heteroaromatic compounds, such as 2- and 4-vinylpyridine, 2- and 4-allylpyridine, and the salts thereof.

Suitable $C_2$-$C_8$-monoolefins and nonaromatic hydrocarbons having at least two conjugated double bonds are, for example, ethylene, propylene, isobutylene, isoprene, butadiene, etc.

The aforementioned monomers can be used individually, in the form of mixtures within one monomer class, or in the form of mixtures of different monomer classes.

In a specific embodiment, the process according to the invention serves to prepare acrylic acid homo- and copolymers.

Suitable acrylic acid copolymers preferably have at least one comonomer which is selected from $\alpha,\beta$-ethylenically unsaturated dicarboxylic acids, the mono- and diesters and anhydrides thereof; esters of $\alpha,\beta$-ethylenically unsaturated mono- or dicarboxylic acids with $C_1$-$C_{20}$-alkanols; (meth)acylamide, esters of vinyl alcohol with $C_1$-$C_{30}$-mono-carboxylic acids; vinyl-substituted nitrogenheterocycles and mixtures thereof.

In a specific embodiment, the comonomer is selected from maleic anhydride, acrylamide, methacrylamide, vinylformamide, vinylacetamide, N-vinylimidazole and mixtures thereof.

In a further specific embodiment, the process according to the invention serves to prepare vinylpyrrolidone homo- and copolymers.

Branching Agents

In the preparation of the inventive polymer dispersions, at least one crosslinker can be used in addition to the aforementioned monomers. According to the invention, these crosslinkers are used in such a low concentration that they merely bring about branching. In the context of the present invention, they are accordingly referred to as branching agents. In this way, the rheological properties of the polymer dispersions can be modified. Monomers which possess a crosslinking function are compounds having at least two polymerizable, ethylenically unsaturated, nonconjugated double bonds in the molecule.

Suitable branching agents are, for example, acrylic esters, methacrylic esters, allyl ethers or vinyl ethers of at least dihydric alcohols. The OH groups of the parent alcohols may be entirely or partly etherified or esterified; however, the branching agents comprise at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and polyethylene glycols, polypropylene glycols and polytetrahydrofurans having molecular weights of in each case from 200 to 10000. Apart from the homopolymers of ethylene oxide and propylene oxide, it is also possible to use block copolymers of ethylene oxide or propylene oxide, or copolymers which comprise incorporated ethylene oxide and propylene oxide groups. Examples of parent alcohols having have more than two OH groups are trimethylolpropane, glycerol, pentaerythritol, 1,2,5-pentanetriol, 1,2,6-hexanetriol, cyanuric acid, sorbitan, sugars such as sucrose, glucose, mannose. It will be appreciated that the polyhydric alcohols can also be used after reaction with ethylene oxide or propylene oxide in the form of the corresponding ethoxylates or propoxylates. The polyhydric alcohols can also first be converted to the corresponding glycidyl ethers by reaction with epichlorohydrin.

Further suitable branching agents are the vinyl esters or the esters of monohydric unsaturated alcohols with ethylenically unsaturated $C_3$-$C_6$-carboxylic acids, for example acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. However, it is also possible to esterify the monohydric unsaturated alcohols with polybasic carboxylic acids, for example malonic acid, tartaric acid, trimellitic acid, phthalic acid, terephthalic acid, citric acid or succinic acid.

Further suitable branching agents are esters of unsaturated carboxylic acids with the above-described polyhydric alcohols, for example of oleic acid, crotonic acid, cinnamic acid or 10-undecenoic acid.

Suitable branching agents are also straight-chain or branched, linear or cyclic, aliphatic or aromatic hydrocarbons which possess at least two double bonds which must not be conjugated in aliphatic hydrocarbons, for example divinylbenzene, divinyltoluene, 1,7-octadiene, 1,9-decadiene, 4-vinyl-1-cyclohexene, trivinylcyclohexane or polybutadienes having molecular weights of from 200 to 20000.

Also suitable as branching agents are the acrylamides, methacrylamides and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids as have been described above.

In addition, triallylamine and triallylmonoalkylammonium salts, for example triallylmethylammonium chloride or methylsulfate, are suitable as branching agents.

Also suitable are N-vinyl compounds of urea derivatives, at least difunctional amides, cyanurates or urethanes, for example of urea, ethyleneurea, propyleneurea or tartaramide, for example N,N'-divinylethyleneurea or N,N'-divinylpropyleneurea.

Further suitable branching agents are divinyldioxane, tetraallylsilane or tetravinylsilane. It will be appreciated that it is also possible to use mixtures of the aforementioned compounds.

Regulators

The free-radical polymerization is effected in the presence of at least one regulator. Regulators are used preferably in an amount of from 0.05 to 25% by weight and more preferably from 0.1 to 10% by weight, based on the total weight of the monomers used for the polymerization.

When the regulator used serves simultaneously as a solvent for the monomer used, it is used in an amount of up to 70% by weight based on the total weight of the monomers used for the polymerization. In principle, it is also possible to use the regulator used as the solvent in higher amounts. However, it is uneconomic to use the regulator in an amount of above 70% by weight, based on the total weight of the monomers used for the polymerization.

Regulators (polymerization regulators) refer generally to compounds with high transfer constants. Regulators accelerate chain transfer reactions and hence bring about a lowering of the degree of polymerization of the resulting polymers, without influencing the gross reaction rate. For the regulators, a distinction can be drawn between mono-, bi- or polyfunctional regulators according to the number of functional groups in the molecule which can lead to one or more chain transfer reactions. Suitable regulators are described in detail, for example, by K. C. Berger and G. Brandrup in J. Brandrup, E. H. Immergut, Polymer Handbook, 3rd ed., John Wiley & Sons, New York, 1989, p. II/81-II/141.

Suitable regulators are, for example, aldehydes such as formaldehyde, acetaldehyde, propionaldehyde, n-butyraldehyde, isobutyraldehyde.

In addition, the regulators used may also be: formic acid, the salts or esters thereof, such as ammonium formate, 2,5-diphenyl-1-hexene, hydroxylammonium sulfate and hydroxylammonium phosphate.

Further suitable regulators are halogen compounds, for example alkyl halides such as tetrachloromethane, chloroform, bromotrichloromethane, bromoform, allyl bromide and benzyl compounds such as benzyl chloride or benzyl bromide.

Compounds which are suitable as regulators and can also serve as solvents are mono- and polyfunctional alcohols. For example, they may be selected individually or in a combination from ethyl alcohol, methyl alcohol, propyl alcohol, butyl alcohol, isobutanol, tert-butyl alcohol, pentyl alcohol, higher alcohols of C12 to C14, methoxyethanol, ethoxyethanol, propoxyethanol, ethylene glycol monoacetate, cyclohexanol, benzyl alcohol, phenethyl alcohol and the like, and from alkylene glycols, for example ethylene glycol, 1,2-propanediol, 1,3-propanediol, 1,2-butanediol, 1,3-butanediol, 1,4-butanediol, 2,3-butanediol, 1,2-pentanediol, 1,3-pentanediol, 1,4-pentanediol, neopentyl glycol, 1,5-pentanediol, 2,3-pentanediol, 2,4-pentanediol, 1,6-hexanediol and the like; hydroquinone diethylol ether; ethylene glycol derivatives, for example diethylene glycol, triethylene glycol and the like; aliphatic polyfunctional alcohols, for example sorbitol, cyclohexanediol, xylylenediol and the like; glycerol and mono- or disubstituted derivatives thereof consisting of fatty acid glyceryl esters, for example monoacetin, monolaurin, monoolein, monopalmitin, monostearin and the like, and glyceryl monoethers, for example thymyl alcohol, glyceryl monomethyl ether, butyl alcohol and the like; trimethylolpropane and mono- or disubstituted derivatives thereof; pentaerythritol and mono- to trisubstituted derivatives thereof, for example pentaerythrityl dioleate and pentaerythrityl distearate; a fatty acid-sorbitan ester; saccharides consisting of monosaccharides, for example erythritol, threose, ribose, arabinose, xylose, lyxose, allose, aldose, glucose, mannose, gulose, idose, galactose, talose, fructose, apiose, rhamnose, psicose, sorbose, tagarose, ribulose, xylulose and the like; disaccharides, for example sucrose, realrose, lactose and the like.

These alcohols which have no addition polymerization reactivity can be selected according to the use of the polymer to be obtained. For example, in the case that the polymer is used as a raw material for a thermoplastic formulation or a thermoplastic polymer, preference is given to using a monofunctional alcohol, and, in the case that the polymer is used as a raw material for a reactive resin formulation or a thermoset polymer, preference is given to using a polyfunctional alcohol. In addition, the homogeneity of the reaction system is increased when the viscosity is low in the course of the polymerization reaction. The alcohol without polymerization activity therefore preferably has a low molecular weight. For example, the molecular weight is 400 or less and more preferably 200 or less.

Further suitable regulators are allyl compounds, for example allyl alcohol, functionalized allyl ethers such as allyl ethoxylates, alkyl allyl ethers or glyceryl monoallyl ether.

When a solvent other than the regulator is used, the regulators used are preferably compounds which comprise sulfur in bound form. However, sulfur-containing regulators cannot be premixed with the monomer to be used in accordance with the invention.

Compounds of this type are, for example, inorganic hydrogensulfites, disulfites and dithionites, or organic sulfides, disulfides, polysulfides, sulfoxides and sulfones. These include di-n-butyl sulfide, di-n-octyl sulfide, diphenyl sulfide, thiodiglycol, ethylthio-ethanol, diisopropyl disulfide, di-n-butyl disulfide, di-n-hexyl disulfide, diacetyl disulfide, diethanol sulfide, di-t-butyl trisulfide, dimethyl sulfoxide, dialkyl sulfide, dialkyl disulfide and/or diaryl sulfide.

Suitable polymerization regulators are also thiols (compounds which obtain sulfur in the form of SH groups, also known as mercaptans). Preferred regulators are mono-, bi- and polyfunctional mercaptans, mercaptoalcohols and/or mercaptocarboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or n-dodecyl mercaptan.

Examples of bifunctional regulators which comprise two sulfur atoms in bound form are bifunctional thiols, for example dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bis(thioglycolates) and butanediol bis(thioglycolate). Examples of polyfunctional regulators are compounds which comprise more than two sulfur atoms in bound form. Examples thereof are trifunctional and/or tetrafunctional mercaptans.

More preferably, in the case that the regulator is simultaneously used as the solvent, alcohols and alkyl halides are used as the regulator.

All regulators mentioned may be used individually or in combination with one another.

The regulator can be used as such or dissolved in a solvent. In general, the regulator is used dissolved in a suitable solvent in order thus to be able to meter it in more accurately. Suitable solvents are those specified for the polymerization hereinafter.

Initiator

Useful initiator systems are in principle all initiators known for the free-radical polymerization of ethylenically unsaturated monomers. They are generally initiators based on organic or inorganic peroxides, azo initiators or so-called redox initiator systems. The amount of initiator is typically from 0.1 to 20% by weight, in particular from 0.2 to 10% by weight and especially from 0.5 to 7% by weight, based on the total amount of monomers to be polymerized. They are especially thermal initiators having a suitable half-life at the polymerization temperature.

Examples of suitable polymerization inhibitors are specified below:

peroxide compounds: these include, for example, organic peroxides and hydroperoxides such as acetyl peroxide, benzoyl peroxide, lauroyl peroxide, tert-butyl peroxyisobutyrate, caproyl peroxide, cumene hydroperoxide, di-tert-butyl peroxide, tert-butyl hydroperoxide, tert-amyl hydroperoxide, tert-butylperoxy-acetate, tert-butyl peroxybenzoate, tert-butyl peroxyoctoate, tert-butylperoxy-neodecanoate, tert-amyl peroxypivalate, tert-butyl peroxypivalate, diisopropyl peroxydicarbonate, dicyclohexyl peroxydicarbonate, dicumyl peroxide, dibenzoyl peroxide, dilauroyl peroxide; inorganic peroxides such as hydrogen peroxide, peroxodisulfuric acid and salts thereof, such as ammonium, sodium and potassium peroxodisulfate;

azo compounds such as 2,2'-azobisisobutyronitrile (AIBN), 2,2'-azobis(2-methylbutyronitrile), 2,2'-azobis[2-methyl-N-(2-hydroxyethyl)propionamide], 1,1'-azobis(1-cyclohexanecarbonitrile), 2,2'-azobis(2,4-dimethylvaleronitrile), 2,2'-azobis(N,N'-dimethylenisobutyroamidine), 2,2'-azobis-(N,N'-dimethyleneisobutyroamidine), 2,2'-azobis(2-methylpropioamidine), N-(3-hydroxy-1,1-bis(hydroxymethyl)propyl)-2-[1-(3-hydroxy-1,1-bis-(hydroxymethyl)propylcarbamoyl)-1-methylethylazo]-2-methylpropionamide and N-(1-ethyl-3-hydroxypropyl)-2-[1-(1-ethyl-3-hydroxypropylcarbamoyl)-1-methyl-ethylazo]-2-methylpropionamide; 2,2'-azobis(2-cyano-2-butane), dimethyl-2,2'-azobisdimethyl isobutyrate, 4,4'-azobis(4-cyanopentanoic acid), 1,1'-azobis(cyclohexanecarbanitrile), 2-(tert-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]propionamide, 2,2'-azobis(N,N'-dimethylene-isobutyramidine)dihydrochloride, 2,2'-azobis(2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl] propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis (isobutyramide) anhydrate, 2,2'-azobis(2,2,4-trimethylpentane), 2,2'-azobis(2-methylpropane).

redox initiators: this is understood to mean initiator systems which comprise an oxidizing agent, for example a salt of peroxodisulfuric acid, hydrogen peroxide or an organic peroxide such as tert-butyl hydroperoxide, and a reducing agent. As the reducing agent, they preferably comprise a sulfur compound which is especially selected from sodium hydrogensulfite, sodium hydroxymethanesulfinate and the hydrogensulfite adduct to acetone. Further suitable reducing agents are nitrogen and phosphorus compounds such as phosphorous acid, hypophosphites and phosphinates, di-tert-butyl hyponitrite and dicumyl hyponitrite, and also hydrazine and hydrazine hydrate and ascorbic acid. In addition, redox initiator systems may comprise an addition of small amounts of redox metal salts such as iron salts, vanadium salts, copper salts, chromium salts or manganese salts, for example the ascorbic acid/iron(II) sulfate/sodium peroxodisulfate redox initiator system.

The abovementioned initiators can also be used in any combinations.

The initiators can be used as such or dissolved in a solvent. Preference is given to using the initiators dissolved in a suitable solvent. Suitable solvents are those specified for the polymerization below.

Solvents and Regulating Solvents or Solvents which Act as Regulators

The polymers can be prepared by free-radical solution polymerization in an aqueous medium, in an organic solvent or in a solvent mixture. Examples of organic solvents are alcohols, for example methanol, ethanol, n-propanol and isopropanol, dipolar aprotic solvents, for example N-alkyllactams such as N-methylpyrrolidone (NMP), N-ethylpyrrolidone, and also dimethyl sulfoxide (DMSO), N,N-dialkylamides of aliphatic carboxylic acids such as N,N-dimethylformamide (DMF), N,N-dimethylacetamide, and also aromatic, aliphatic and cycloaliphatic hydrocarbons, such as alkylaromatics, hexane, benzene, toluene or xylene, which may be halogenated, and mixtures thereof. Preferred solvents are water, isopropanol, methanol, toluene, DMF and NMP, and mixtures thereof.

In a preferred embodiment, the reaction is effected in an aqueous polymerization medium. An aqueous polymerization medium is understood to mean water and mixtures of water with one or more organic, water-miscible solvents. The proportion of organic, water-miscible solvents will typically not exceed 50% by volume, in particular 20% by volume and especially 10% by volume, based on the total amount of water and organic solvent. Examples of water-miscible, organic solvents are $C_1$-$C_4$-alkanols such as methanol, ethanol, n-propanol, isopropanol, n-butanol, cyclic ethers such as dioxane and tetrahydrofuran, and alkylene carbonates such as ethylene carbonate (2-oxo-1,3-dioxolane) and propylene carbonate (2-oxo-1,3-dioxane). The preferred aqueous polymerization medium is water.

In the preferred embodiment, the polymerization is performed preferably at a temperature in the range from 30° C. to 180° C., in particular at a temperature in the range from 40° C. to 150° C. and more preferably within a range from 60° C. to 110° C.

In a further preferred embodiment, the reaction is effected in an organic/aqueous polymerization medium. An organic/aqueous polymerization medium is understood to mean mixtures of water with one or more organic, water-miscible solvents. The proportion of the organic, water-miscible solvents will typically be above 50% by volume and especially above 70% by volume, based on the total amount of water and organic solvent.

In this preferred embodiment, the polymerization is performed preferably at a temperature in the range from 50° C. to 200° C., more preferably at a temperature in the range from 70° C. to 180° C. and in particular at a temperature in the range from 90° C. to 150° C.

The polymerization is effected typically under atmospheric pressure, but it can also proceed under reduced or elevated pressure. A suitable range is between 0.5 and 50 bar and preferably between 1 and 25 bar. The lower limit of the pressure range is defined generally by the particular boiling pressure at the appropriate operating or reaction temperature.

The residence time in the reaction zone for the polymerization is preferably in the range from 5 sec to 30 min, more preferably in the range from 10 sec to 15 min and especially in the range from 1 min to 10 min.

The reaction mixture can be subjected to an aftertreatment which is, for example, selected from postpolymerization, deodorization, neutralization, a different additization and combinations thereof. This subsequent step can be effected batchwise or continuously. Preference is given to continuous performance of postpolymerization, deodorization, neutralization and/or a different additization.

To achieve very pure polymers with a low residual monomer content, the polymerization (main polymerization) can be followed by a postpolymerization step. The postpolymerization can be effected in the presence of the same initiator system as the main polymerization or of another initiator system. Preference is given to effecting the postpolymerization at least at the same temperature as, preferably at a higher temperature than, the main polymerization.

In a further embodiment of the invention, at least one additive is added to the reaction discharge. This additive can, for example, be mixed with the reaction discharge in a mixer. The additive may be either an individual additive or a mixture of additives.

In a particularly preferred embodiment, for the aftertreatment, at least one additive is mixed with the reaction discharge using a mixer with microstructures. Each of the additives may either be any additive customary for this application or in each case a mixture of additives customary for this application. These include, for example, pH-adjusting substances, reducing agents and bleaches, for example the alkali metal salts of hydroxymethanesulfinic acid (e.g. Rongallit® C from BASF Aktiengesellschaft), complexing agents, deodorants, flavorings, odorants, disinfectants, preservatives and viscosity modifiers.

Resulting homopolymers of acrylic acid preferably have a number-average molecular weight ($M_n$) according to gel permeation chromatography, GPC (Size Exclusion Chromatography, SEC) in an aqueous medium in the range from 1000 to 20000 daltons, preferably in the range from 1000 to 10000 daltons and more preferably in the range from 1000 to 8000 daltons, where the ratio of the weight-average molar mass ($M_w$) to the number-average molar mass, defined as the polydispersity $D(=M_w/M_n)$, is less than 2.5 and preferably less than 2.0.

The resulting copolymers of acrylic acid with, for example, maleic anhydride, acrylamide, methacrylamide, vinylformamide or vinylimidazole have a number-average molecular weight ($M_n$) according to gel permeation chromatography, GPC (Size Exclusion Chromatography, SEC) in an aqueous medium in the range from 1000 to 100000 daltons and preferably in the range from 3000 to 60000 daltons, where the ratio of the weight-average molar mass ($M_w$) to the number-average molar mass, defined as the polydispersity D(=$M_w$/$M_n$), is less than 10 and preferably less than 5.

When an organic solvent is used in the preparation of the polymers, it can be removed by customary methods known to those skilled in the art, for example by distillation or evaporation under reduced pressure.

The resulting liquid polymer compositions can be converted to powder form by various drying methods, for example spray drying, fluidized spray drying, roller drying or freeze drying. Preference is given to using spray-drying. The dry polymer powders thus obtained can advantageously be converted again to a polymer solution by dissolution in a suitable solvent. Polymers insoluble in aqueous media can generally be converted to an aqueous dispersion by (re)dispersing. Pulverulent copolymers have the advantage of better storability and of simpler transportability, and generally exhibit a lower tendency to become infested by microbes.

An inventive apparatus for continuously preparing polymers comprises:
- at least three reservoir vessels for liquid starting materials, said starting materials comprising at least one monomer-containing starting material, at least one initiator-containing starting material and at least one starting material comprising a polymerization regulator,
- one feed each for the liquid streams from the at least three reservoir vessels,
- one or more mixers connected in series, to which the liquid streams are supplied and in which they are mixed to obtain a reaction mixture, at least the last mixer in flow direction before entry into the reaction zone(s) being equipped with microstructures,
- at least one reaction zone, and
- a discharge vessel which is optionally equipped with one or more addition and/or mixing devices.

The present invention further provides for the use of the inventive apparatus for continuously preparing a polymer by free-radical polymerization.

Suitable mixers are known from the prior art. They may in principle be mixers with or without microstructures, provided that the conditions defined at the outset are met. Suitable mixers without microstructures, which are also referred to as "conventional" mixers in the context of the present invention, are all mixers which are suitable for the continuous mixing of liquids and are sufficiently well known to those skilled in the art. They are selected according to the process technology requirements.

Conventional mixers differ from mixers with microstructures by their characteristic dimension in the zone relevant for the mixing. In the context of the present invention, the characteristic dimension of a flow device, for example of a mixer, is understood to mean the smallest dimension at right angles to the flow direction. The characteristic dimension of a micromixer is significantly smaller than that of a conventional mixer (for example lower at least by the factor of 10 or at least by the factor of 100 or at least by the factor of 1000) and is typically in the micrometer to millimeter range.

Conventional mixers have a characteristic dimension in the region relevant for the mixing of more than 10 mm, mixers with microstructures, in contrast, of at most 10 mm. The characteristic dimension of a mixer with microstructures used in accordance with the invention is preferably in the range from 1 µm to 10000 µm, more preferably in the range from 10 µm to 5000 µm and especially in the range from 25 µm to 4000 µm. The optimal characteristic dimension arises here from the requirements on the mixing quality and the tendency of the mixing apparatus to become blocked. Mixers with microstructures are also referred to as micromixers.

Examples of suitable mixers without microstructures are both conventional dynamic mixers, for example mixing pumps and stirred tanks with continuous flow, and mixing apparatus installed into pipelines, for example baffle plates, orifice plates, jet mixers, T and Y pieces, and static mixers.

Examples of suitable micromixers are:
I static mixers
  1. laminar diffusion mixers
     a) "chaotic-laminar" mixers, for example T mixers, Y mixers or cyclone mixers,
     b) multilamination mixers or interdigital mixers
  2. laminar diffusion mixers with convective crossmixing, for example shaped mixing channels or channels with secondary structures
  3. split-recombine mixers, for example caterpillar mixers
II dynamic mixers, for example mixing pumps
III combinations thereof;
these of course satisfying the abovementioned conditions for the characteristic dimensions.

In a suitable embodiment, mixers with microstructures which have at least one mixing channel are used. The mixing in the micromixers can proceed in a laminar, laminar-chaotic or turbulent manner.

Micromixers preferred in accordance with the invention will be illustrated in detail hereinafter.

In laminar diffusion mixers, substreams of the fluid, which has been fanned out in a microstructure into a multitude of microscopically small flow lamellae with a thickness in the range from 10 to 2000 µm, especially from 20 to 1000 µm and in particular from 40 to 500 µm, are mixed exclusively by molecular diffusion at right angles to the main flow direction. The mixer can be designed via the Fourier number Fo=$\tau/\tau_D$, which is the ratio of residence time in the mixer to the diffusion time between the individual flow lamellae. For the diffusion time $T_D$, $$T_D = \frac{s^2}{D}$$

in which
s is half the flow lamellar thickness [m]
D is the diffusion coefficient [$m^2$/sec].

This ratio is selected to be greater than 1, preferably greater than 2, more preferably greater than 3 and especially greater than 4, in order to ensure very good molecular mixing of the streams at the outlet of the mixer.

Laminar diffusion mixers can be configured as simple T or Y mixers or as so-called multilamination mixers. In the case of the T or Y mixer, the two (or else more than two) substreams to be mixed are fed to an individual channel through a T- or Y-shaped arrangement. What is crucial for the transversal diffusion path $S_{Diff}$ here is the channel width $\delta_K$. Typical channel widths between 100 µm and 1 mm give rise to customary mixing times in the range from seconds to minutes for liquids. When, as in the present process, liquids are mixed, it is advantageous to promote the mixing operation additionally, for example by means of flow-induced transverse mixing.

In the case of multilamination mixers or interdigital mixers, the substreams to be mixed are divided in a distributor into a large number of microflow threads and, at the exit of the distributor, are then fed to the mixing zone alternately in lamellae. For liquids, mixing times in the range of seconds are achieved with the conventional multilamination mixers. Since this is insufficient for some applications (for example in the case of fast reactions), the basic principle has therefore been developed further by focusing the flow lamellae once again additionally by geometric or hydrodynamic means. The geometric focusing is achieved by a constriction in the mixing zone. The hydrodynamic focusing is achieved by two sidestreams which flow toward the main stream at right angles and thus further compress the flow lamellae. The focusing described allows lateral dimensions of the flow lamellae of a few micrometers to be achieved, such that even liquids can be mixed within a few 10 s of ms.

The laminar diffusion mixers with convective crossmixing used may be micromixers with structured walls. In the case of micromixers with structured walls, secondary structures (grooves or projections) are disposed on the channel walls. They are preferably arranged at a particular angle to the main flow direction, for example at an angle of from about 30° up to 90°. In the case of inertia-dominated flow conditions, secondary vortices form as a result, which support the mixing process.

In a further suitable embodiment, the mixer with microstructure used is a split-recombine mixer. Split-recombine mixers are notable for stages composed of recurrent separation and combination of streams. Two regions of an unmixed fluid stream (it is usual to start from two equally large lamellae) are each conducted away from one another in one stage, distributed into two new regions in each case, and combined again. All four regions are arranged alongside one another in alternation such that the original geometry is re-established. In each of these stages, the number of lamellae is thus doubled stage by stage and lamellar thickness and diffusion pathway are thus halved.

Examples of suitable split-recombine mixers are the caterpillar mixer from IMM and the caterpillar mixer from BTS-Ehrfeld.

Examples of suitable dynamic micromixers are, for example, micro-mixing pumps.

Examples of preferred static micromixers are especially the following laminar diffusion mixers:
"chaotic-laminar" mixers, for example T or Y pieces with a very small capillary diameter in the range from 100 μm to 1500 μm and preferably from 100 μm to 800 μm at the mixing point, and cyclone mixers;
multilamination mixers, for example the LH2 and LH25 slit plate mixers or larger types from Ehrfeld, and the interdigital mixers SIMM and Starlam® from IMM;
micromixers according to the multilamination principle with superimposed expanded flow, for example the SuperFocus Interdigital SFIMM microstructure mixer from IMM.

In one embodiment, the inventive apparatus comprises two reaction zones.

In a preferred embodiment, the inventive apparatus has at least one further feed for a liquid stream which is arranged in the course of a reaction zone or downstream of a reaction zone.

More preferably, the inventive apparatus has at least one further feed for a liquid monomer stream which is arranged downstream of a reaction zone and which is followed in flow direction by at least one other reaction zone.

Alternatively or additionally, it is also possible to supply a further stream comprising an initiator for polypolymerization in a downstream reaction zone.

More particularly, the inventive apparatus has at least one further feed for a liquid additive stream which is arranged downstream of the last reaction zone in flow direction.

More preferably, the further liquid stream supplied and the discharge from the reaction zone which is followed downstream by the feed are conducted into a mixer with microstructures and mixed therein.

In the context of the present invention, a reaction zone is understood to mean a section of a reactor in flow direction of the liquid streams in which the polymerization proceeds. A reaction zone may be disposed within part of a reactor, within a whole reactor or within two or more reactors. In a preferred embodiment, each reaction zone is disposed in a separate reactor.

Particular preference is given to using at least one reactor with at least one microstructured reaction zone for the polymerization. The reactor with a microstructured reaction zone is also referred to here and hereinafter as a reactor with microstructures, microstructured reactor or microreactor. Microstructured reactors are suitable for ensuring thermal homogeneity transverse to the flow direction. At the same time, each differential volume element in principle has essentially the same temperature over the particular flow cross section. The maximum permissible temperature differences within a flow cross section depend on the desired product properties. The maximum temperature difference in one flow cross section is preferably less than 40° C., more preferably less than 20° C., even more preferably less than 10° C. and especially less than 5° C.:

Conventional reactors and microreactors differ by their characteristic dimension and especially by the characteristic dimension of their reaction zones. In the context of the present invention, the characteristic dimension of a device, for example of a reactor, is understood to mean the smallest dimension at right angles to the flow direction. The characteristic dimension of the reaction zone of a microreactor is significantly less than that of a conventional reactor (for example at least by a factor of 10 or at least by a factor of 100 or even at least by a factor of 1000) and is typically in the range from 100s of nanometers to a few 10s of millimeters. It is frequently in the range from 1 μm to 30 mm. Compared to conventional reactors, microreactors therefore exhibit significantly different behavior in relation to the heat and mass transfer processes which proceed. As a result of the greater ratio of surface area to reactor volume, for example, very good heat supply and removal is enabled, which is why it is also possible to carry out strongly endo- or exothermic reactions virtually isothermally.

Conventional reactors have a characteristic dimension of >30 mm, microreactors, in contrast, ≤30 mm. In general, the characteristic dimension of the reaction zone of a reactor with microstructures is at most 30 mm, for example from 0.1 to 30 mm or preferably from 0.2 to 30 mm or more preferably from 0.4 to 30 mm; preferably at most 20 mm, for example from 0.1 to 20 mm or preferably from 0.2 to 20 mm or more preferably from 0.4 to 20 mm; more preferably at most 15 mm, for example from 0.1 to 15 mm or preferably from 0.2 to 15 mm or more preferably from 0.4 to 15 mm; even more preferably at most 10 mm, for example from 0.1 to 10 mm or preferably from 0.2 to 10 mm or more preferably from 0.4 to 10 mm; even more preferably at most 8 mm, for example from 0.1 to 8 mm or preferably from 0.2 to 8 mm or more preferably from 0.4 to 8 mm; in particular at most 6 mm, for example from 0.1 to 6 mm or preferably from 0.2 to 6 mm or more preferably from 0.4 to 6 mm; especially at most 4 mm, for example from 0.1 to 4 mm or preferably from 0.2 to 4 mm or more preferably from 0.4 to 4 mm, and even more especially from 0.4 to 3 mm.

Microreactors for use in accordance with the invention are preferably selected from temperature-controllable tubular reactors, tube bundle heat exchangers, plate heat exchangers and temperature-controllable tubular reactors with internals. As characteristic dimensions, they preferably have tube or capillary diameters in the range from 0.1 mm to 25 mm, more preferably in the range from 0.5 mm to 6 mm, even more preferably in the range from 0.7 to 4 mm and especially in the range from 0.8 mm to 3 mm, and layer heights or channel widths in the range from preferably 0.2 mm to 10 mm, more preferably in the range from 0.2 mm to 6 mm and especially in the range from 0.2 mm to 4 mm. Tubular reactors with internals for use in accordance with the invention have tubular diameters in the range from 5 mm to 500 mm, preferably in the range from 8 mm to 200 mm and more preferably in the range from 10 mm to 100 mm. Alternatively, it is also possible in accordance with the invention to use plate apparatus comparable flat channels with inlaid mixing structures. They have heights in the range from 1 mm to 20 mm, and widths in the range from 10 mm to 1000 mm and especially in the range from 10 mm to 500 mm. Optionally, the tubular reactors may comprise mixing elements permeated by temperature control channels (for example of the CSE-XR® type from Fluitec, Switzerland).

The optimal characteristic dimension arises here from the requirements on the permissible anisothermicity of the reaction, the maximum permissible pressure drop and the proneness of the reactor to become blocked.

Particularly preferred microreactors are:
tubular reactors composed of capillaries, capillary bundles with tube cross sections of from 0.1 to 25 mm, preferably from 0.5 to 6 mm, more preferably from 0.7 to 4 mm, with or without additional mixing internals, where a temperature control medium may flow around the tubes or capillaries;
tubular reactors in which the heat carrier is conducted within the capillaries/tubes, and the product whose temperature is to be controlled is conducted around the tubes and homogenized by internals (mixing elements), for example of the CSE-SX® type from Fluitec, Switzerland;
plate reactors which, like plate heat exchangers, are constructed with insulated parallel channels, networks of channels or areas which are equipped with or have no flow-breaking internals (posts), the plates conducting product and heat carrier in parallel or in a layer structure which has alternating heat carrier and product layers, such that chemical and thermal homogeneity can be ensured during the reaction; and
reactors with "flat" channel structures which have a "microdimension" only in terms of height and can be virtually as broad as desired, whose typical comb-shaped internals prevent the formation of a flow profile and lead to a narrow residence time distribution which is important for the defined reaction and residence time.

In a preferred embodiment of the invention, at least one reactor which has the residence time characteristics of plug flow is used. When plug flow is present in a tubular reactor, the state of the reaction mixture (for example temperature, composition, etc.) can vary in flow direction, but the state of the reaction mixture is the same for each individual cross section at right angles to the flow direction. All volume elements entering the tube thus have the same residence time in the reactor. In figurative terms, the liquid flows through the tube as if it were an array of plugs sliding easily through the tube. In addition, the crossmixing as a result of the intensified mass transfer at right angles to the flow direction can compensate for the concentration gradient at right angles to the flow direction.

In spite of the usually laminar flow through apparatus with microstructures, backmixing can thus be prevented and a narrow residence time distribution can be achieved in a similar manner to that in an ideal flow tube.

The Bodenstein number is a dimensionless parameter and describes the ratio of the convection flow to the dispersion flow (for example M. Baerns, H. Hofmann, A. Renken, Chemische Reaktionstechnik [Chemical Reaction Technology], Lehrbuch der Technischen Chemie [Textbook of Industrial Chemistry], volume 1, 2nd edition, p. 332 ff). It thus characterizes the backmixing within a system.

$$Bo = \frac{uL}{D_{ax}}$$

where
u is the flow rate $[ms^{-1}]$
L is the length of reactor [m]
$D_{ax}$, is the coefficient of axial dispersion $[m^2h^{-1}]$ A Bodenstein number of zero corresponds to complete backmixing in an ideal continuous stirred tank. An infinitely large Bodenstein number, in contrast, means absolutely no backmixing, as in the case of continuous flow through an ideal flow tube.

In capillary reactors, the desired backmixing behavior can be established by adjusting the ratio of length to diameter as a function of the substance parameters and the flow state. The underlying calculation methods are known to those skilled in the art (for example M. Baerns, H. Hofmann, A. Renken: Chemische Reaktionstechnik, Lehrbuch der Technischen Chemie, Volume 1, $2^{nd}$ edition, p. 339 ff). If very low-backmixing behavior is to be achieved, the above-defined Bodenstein number is preferably selected to be greater than 10, more preferably greater than 20 and especially greater than 50. For a Bodenstein number of greater than 100, the capillary reactor then has substantially plug flow character.

Advantageous materials for the mixers and reactors for use in accordance with the invention have been found to be austenitic stainless steels which are corrosion-resistant in the region of low temperatures, such as 1.4541 or 1.4571, generally known as V4A and as V2A respectively, and stainless steels of US types SS316 and SS317Ti. At higher temperatures and under corrosive conditions, PEEK (polyetheretherketone: high-temperature-resistant thermoplastic material) is likewise suitable. However, it is also possible to use more corrosion-resistant Hastelloy® types, glass or ceramic as materials and/or corresponding coatings, for example $TiN_3$, Ni-PTFE, Ni-PFA or the like, for the mixers and reactors for use in accordance with the invention.

Owing to the high coefficients of heat transfer and owing to a high ratio of surface area to reaction volume, the heat transfer is selected such that temperature deviations in the reaction medium relative to the temperature of the temperature control medium of less than 40° C., preferably of less than 20° C., more preferably of less than 10° C. and especially of less than 5° C. occur. The reaction can thus proceed under substantially isothermal and hence defined and controlled conditions. In order to achieve this, according to the exothermicity and characteristic reaction time of the polymerization reaction, a ratio of heat exchange area to reaction volume of greater than 250 $m^2/m^3$, preferably greater than 500 $m^2/m^3$, more preferably greater than 1000 $m^2/m^3$ and especially greater than 2000 $m^2/m^3$ has to be selected. At the same time, the coefficient of heat transfer on the side of the reaction medium must be more than 50 $W/m^2K$, preferably more than 100 W/m²K, more preferably more than 200 W/m²K and especially more than 400 W/m²K.

To determine the product of volume-specific heat transfer area and coefficient of heat transfer, the following relationship can be employed:

$$\alpha \cdot \left(\frac{A}{V}\right) = \frac{\Delta H \cdot \rho}{\Delta T \cdot \Delta t_R}$$

in which
- $\alpha$ is the coefficient of heat transfer [W/m²K],
- A/V is the volume-specific heat transfer area [m²/m³],
- $\Delta H$ is the reaction enthalpy [J/kg],
- $\Delta T$ is the maximum permissible temperature deviation in the reaction medium [K],
- $\rho$ is the partial density of the monomer in the reaction mixture [kg/m³] and
- $\Delta t_R$ is the characteristic reaction time [s].

This gives rise to a product of coefficient of heat transfer and volume-specific heat transfer area for the reaction zone of preferably greater than 12500 W/m³K, more preferably greater than 50000 W/m³K, even more preferably greater than 200000 W/m³K and especially greater than 800000 W/m³K.

The inventive apparatus is illustrated in detail hereinafter with reference to FIG. 1, without being limited to this embodiment. For this purpose, the following reference numerals are used in FIG. 1:

| | |
|---|---|
| 1 | Reservoir vessel |
| 2 | Filter (optional) |
| 3 | Mixer, optionally with microstructure |
| 4 | Reservoir vessel |
| 5 | Filter (optional) |
| 6 | Reservoir vessel |
| 7 | Filter (optional) |
| 8 | Mixer with microstructure |
| 9 | Microstructured reactor, temperature-controllable |
| 10 | Mixer, optionally with microstructure, temperature-controllable |
| 11 | Reactor, optionally microstructured, temperature-controllable |
| 12 | Discharge vessel with stirrer apparatus, temperature-controllable |

The apparatus comprises two reservoir vessels 1 and 4 which comprise the starting mixtures, and a further reservoir vessel 6 for a further starting material. The reservoir vessels 1 and 4 are each connected to a first mixer 3 via a feed with a conveying device and filters 2 and 5 (each optional). The mixer 3 may optionally have microstructures. The first mixer 3 is followed downstream by a second mixer 8 with microstructures. The reservoir vessel 6 is likewise connected to the second mixer 8 via a feed with a conveying device and filter 7 (optional). The mixers 3 and 8 may optionally be combined to form one mixing unit which is then equipped with microstructures. The microstructured mixer 8 is followed downstream by a temperature-controllable reactor 9 which is equipped with a reaction zone with microstructures. The reactor 9 may be followed downstream by a third mixer 10 which in turn may be followed by a reactor 11. Both the mixer 10 and the reaction zone of the reactor 11 are temperature-controllable and may optionally have microstructures. At the outlet end of the apparatus is a temperature-controllable discharge vessel 12. The discharge vessel 12 is equipped with a further feed, a stirrer apparatus and an outlet.

The process according to the invention can likewise be illustrated by FIG. 1, without being limited to this embodiment. For this purpose, the following reference symbols are additionally used for the streams:

A Monomer-solvent mixture
B Initiator-solvent mixture
C Regulator
D Reaction mixture
E Additives and/or further initiator solutions
F Further additives
G Product A monomer-solvent mixture A is conducted from a reservoir vessel 1 with customary metering and regulation devices through a filter 2 (optional) into a mixer 3. The mixer 3 may optionally be configured as a mixer with microstructure. An initiator-solvent mixture B is likewise fed into the mixer 3 from a reservoir vessel 4 by means of customary metering and regulation devices and through a filter 5 (optional). In the mixer 3, the two liquid streams are mixed at reaction temperature.

The mixture (A+B) obtained from the mixer 3 is conducted into a mixer 8. A regulator C is likewise fed into the mixer 8 from a reservoir vessel 6 by means of customary metering and regulation devices and through a filter 7 (optional). The mixer 8 is configured as a mixer with microstructure. The two streams are mixed in the mixer 8 at reaction temperature to give a reaction mixture D.

The two mixing operations can alternatively also be carried out together in one mixing apparatus (3+8).

The mixers 3 and 8 or mixing apparatus (3+8) is followed downstream by a microstructured reactor 9 whose temperature can be controlled and which is operated at virtually constant temperature, i.e. substantially isothermally.

Optionally, a third temperature-controllable mixer 10 can be connected downstream of the reactor 9, in order to add additives, further initiator solutions, etc (E). The mixer 10 may, optionally, be configured as a mixer with microstructure.

Likewise optionally, a further temperature-controllable reactor 11 can be connected downstream of the third mixer 10. This reactor 11 may likewise optionally be configured as a microstructured reactor.

Subsequently, the product is passed into a temperature-controllable discharge vessel 12 with optional stirrer apparatus. Here, it is possible to meter in further additives, etc (F). It can be drawn off from the discharge vessel as product G.

Polymers obtained by the process according to the invention or using an inventive apparatus are advantageously suitable for use in washing compositions, dishwasher detergents, industrial detergents, for pigment dispersion, for water treatment, and as oilfield chemicals.

The polymers obtained by the process according to the invention or using an inventive apparatus are also advantageously suitable as dispersants for pigments. For this purpose, preference is given to using inorganic pigments, for example calcium carbonate, kaolin, titanium dioxide, zinc oxide, zirconium oxide, aluminum oxide, etc. Particular preference is given to ground calcium carbonate (GCC). The aim is the preparation of aqueous suspensions of the abovementioned pigments (so-called pigment slurries). For dispersion of pigments, especially of inorganic pigments, preference is given to using anionic polymers as dispersants. These include especially polymers based on polyacrylic acid and salts thereof.

The polymers obtained by the process according to the invention or using an inventive apparatus are particularly suitable for preparing calcium carbonate slurries which have a solids content of at least 70%. In these calcium carbonate slurries, preferably 95% of the particles have a particle size of less than 2 μm and 75% of the particles a particle size of less than 1 μm. As a result of the use of a polymer obtained by the process according to the invention or using an inventive apparatus as a dispersant, the dispersion and/or grinding proceeds in a particularly energy-efficient manner, and it is possible to achieve a homogeneous size distribution of the pigments. In addition, the grinding time can be reduced, and the resulting suspension has a low viscosity. As a result of the use of a suitable dispersant, the pigment slurry remains stable over a long period, i.e. the rise in the viscosity with time is very low.

ADVANTAGES OF THE INVENTION

When monomer, initiator and regulator are mixed in one initial charge in order to supply them together to a reaction zone, the mixture is not storage-stable even at room temperature, and instead starts to react. Such a reaction mixture has to be transferred immediately to the reaction zone.

Alternatively, monomer and an initiator of appropriately high decomposition temperature can be stored together at ambient temperature for a certain time and the regulator can be mixed in only immediately before the start of the reaction. In contrast, initiator and regulator generally cannot be premixed, since they can form, for example, a redox pair under some circumstances and tend to premature decomposition (free-radical formation), which lowers the desired activity for the polymerization down to inactivity.

Advantageously, the process according to the invention allows performance of a continuous free-radical polymerization at comparatively very low temperatures.

The inventive mixing of the reactants in the cold state has the advantage over the prior art processes that the mixing and the start of the reaction are completely separated from one another. It is thus possible to combine the defined start of the reaction and the course of the reaction which is temperature-controlled, i.e. conducted isothermally, in accordance with the invention to give an advantageously narrower molar mass distribution.

In addition, the process according to the invention allows performance of a polymerization at comparatively low temperatures and with comparatively short residence times.

For better completion of reaction of the monomers, it has been found to be advantageous to meter in further initiator or to add a base and to (partly) neutralize the acid. The neutralization allows the reaction to be accelerated greatly.

The polymers obtained in accordance with the invention have a narrower molar mass distribution $M_n/M_w$ than in polymers prepared in (semi)batchwise mode.

As a result of the low temperature, the corrosion risk of sensitive microstructures and materials is very low.

Since the mixing of the starting materials takes place essentially at ambient temperature, the process is additionally very energy-efficient.

In the case of preparation of particular copolymers, the process leads, according to the reactivity ratio of the resulting copolymerization parameters, to a polymer composition which is homogeneous or changes over the course of the reaction. This can be at least partly compensated for by controlled further metered addition of appropriate components.

The invention is illustrated in detail by the nonlimiting examples which follow.

EXAMPLES

Process Example 1

An aqueous acrylic acid solution (50% by weight) was mixed at room temperature homogeneously with an aqueous sodium persulfate solution (2% by weight) by means of a micromixer and then homogeneously with an aqueous solution of 2-mercaptoethanol (10% by weight) by means of a second micromixer. The resulting reaction solution was pumped in each case through a preheated reaction capillary whose temperature was controlled in an oil bath with a constant flow rate, and the reaction capillaries had different temperatures, materials, diameters and lengths according to table 1 (all feeds by means of laboratory HPLC pumps, from Bischoff).

In example 4, in a departure therefrom, an aqueous 7% by weight sodium persulfate solution and an aqueous 50% by weight solution of 2-mercaptoethanol were used.

In example 5, in a departure therefrom, an aqeuous 3% by weight 2,2'-azobis[2-(2-imidazolin-2-yl)propane]dihydrochloride solution (obtainable, for example, under the VA044 name from Wako Specialty Chemicals, JP) and an aqeuous 20% by weight solution of 2-mercaptoethanol were used.

TABLE 1

| Example | Material | InternalØ [mm][1] | Length [m] | Flow rate [g/h] | Initiator [% by wt.][2] | Regulator [% by wt.][2] | Temperature [° C.] |
|---|---|---|---|---|---|---|---|
| 1 | Stainless steel 1.4571 | 1.0 | 6.4 | 220 | 1 | 5.0 | 130 |
| 2 | alloy 2.4610 | 0.8 | 10.0 | 220 | 1 | 5.0 | 130 |
| 3 | PEEK | 0.8 | 10.0 | 700 | 1 | 2.7 | 100 |
| 4 | 1.4571 | 1.5 × 12*) | 2.0 | 700 | 2 | 5.0 | 80 |
| 5 | 1.4571 | 3 | 10 | 562 | 0.5 | 4.0 | 80 |

[2]% by weight based on monomer
*)rectangular cross section

The analytical data of the polyacrylic acid of examples 1 to 5 prepared by process example 1 in the inventive procedure are listed in table 2.

TABLE 2

| Example | FC [%] | $M_n$ [g/mol] | $M_W$ [g/mol] | PDI $M_w/M_n$ | residual AA [ppm] | Appearance |
|---|---|---|---|---|---|---|
| 1 | 40 | 2900 | 5800 | 2.0 | | colorless, clear, viscous |
| 2 | 40 | 2500 | 5500 | 2.2 | | colorless, clear, viscous |
| 3 | 35 | 4900 | 11500 | 2.3 | | colorless, clear, viscous |
| 4 | 40 | 3500 | 6600 | 1.9 | 230 | colorless, clear, viscous |

TABLE 2-continued

| Example | FC [%] | $M_n$ [g/mol] | $M_W$ [g/mol] | PDI $M_w/M_n$ | residual AA [ppm] | Appearance |
|---|---|---|---|---|---|---|
| 5 | 40 | 3400 | 6900 | 2.0 | <20 | colorless, clear, viscous |

Process Example 2

The aqueous solution of acrylic acid and 2-acrylamido-2-methylpropanesulfonic acid (35:15% by weight) was fed to a micromixer continuously and homogeneously with an aqueous sodium persulfate solution (4% by weight), mixed therein and then mixed homogeneously at room temperature with an aqueous solution of sodium hypophosphite (10% by weight) in a second micromixer. The resulting reaction solution was pumped continuously with a defined flow rate through a reaction capillary whose temperature was controlled in an oil bath, and the reaction capillaries had different temperatures, materials, diameters and lengths according to table 3.

TABLE 3

| Example | Material | Internal⌀ [mm][1] | Length [m][1] | Flow rate [g/h] | Initiator [% by wt.][2] | Regulator [% by wt.][2]* | Temperature [° C.] |
|---|---|---|---|---|---|---|---|
| 1 | stainless steel 1.4571 | 1.6 + 3.0 | 10 + 10 | 730 | 2 | 5 | 80 |
| 2 | stainless steel 1.45711. | 1.6 + 3.0 | 10 + 10 | 830 | 2 | 5 | 80 |

[1] x + y means: In the first capillary, the internal diameter was x mm or the length was x m and, in the directly connected second capillary, the internal diameter was y mm or the length was y m.
[2] % by weight based on monomer The copolymer of examples 1 and 2 prepared by process example 2 according to the inventive procedure had analytical data which are listed in table 4.

TABLE 4

| Example | FG [%] | $M_n$ [g/mol] | $M_w$ [g/mol] | PDI $M_w/M_n$ | Residual AA [ppm] | Appearance |
|---|---|---|---|---|---|---|
| 1 | 40 | 25 000 | 230 000 | 9.2 | 1200 | |
| 2 | 40 | 9000 | 38 900 | 4.3 | <20 | |

Use Example

Grinding of Calcium Carbonate

The aim is the production of highly concentrated slurries of calcium carbonate in water with minimum particle size, which have a minimum viscosity over a long period.

Equipment Used:

Dispermat AE (from VMA Getzmann), DMS 70 double grinding disk, zirconium oxide beads, temperature-controllable jacketed vessel (capacity 1 liter), glass beads of diameter approx. 1 mm;

Particle size determination with Horiba LA 920;

Viscosity measurement with Brookfield DS viscometer

Procedure for the Grinding Tests:

300 g of calcium carbonate powder (mean particle diameter 10 µm) are mixed with 711 g of glass beads and introduced dry into the jacketed vessel with the grinding disk lowered. An aqueous solution of the polymer to be examined (approx. 45 ml) is subsequently added and mixed homogeneously therewith at slow speed. The amount of polymer is calculated such that the concentration of the polymer (solid) based on calcium carbonate (solid) is 1.0% by weight. If the material is homogeneous, the speed is increased to 4000 rpm and grinding is effected for 110 minutes. During this time, it is necessary to add approx. 100 ml of water stepwise in order to ensure good mixing and free flow. During the test, cooling water at 5° C. flows through the jacketed vessel in order to reduce the friction-related heating of the grinding material.

After the grinding has ended, the glass beads are removed using a 780 micrometer filter fabric, and the slurry formed is collected.

All slurries to be examined are then adjusted to a uniform solids content of 73.0% (by adding water or by evaporating water). After the concentration has been set, the samples are left to stand overnight in order to come to equilibrium. The next day, they are stirred with an Ultraturrax stirrer (12000 rpm) for 1 minute. This is the starting point of the viscosity determination. The viscosity of the slurry is determined immediately, after one hour, after 24 hours and after 1 week. The particle size is determined by means of light scattering.

The standard polymers 1 and 2 are homopolymers of acrylic acid and were prepared in a conventional semibatchwise process.

All polymers examined were in fully neutralized form (pH=8) as an aqueous solution of the sodium salt.

TABLE 5

Polymers examined

| Example | $M_n$ [g/mol] | $M_w$ [g/mol] | PDI $M_w/M_n$ |
|---|---|---|---|
| Standard polymer 1 | 2800 | 6900 | 2.5 |
| Standard polymer 2 | 1450 | 2570 | 1.8 |
| Inventive polymer (Tab. 2, Ex. 5) | 3400 | 6900 | 2.0 |

TABLE 6

Viscosity of the slurry as a function of storage time

| | Solids content of slurry [%] | Particle size proportion [%] | | Viscosity [mPas] | | | |
|---|---|---|---|---|---|---|---|
| | | <1 µm | <2 µm | immediately | after 1 h | after 24 h | after 168 h |
| Standard polymer 1 | 73.0 | 82 | 93 | 216 | 908 | 1206 | 1405 |
| Standard polymer 2 | 73.0 | 82 | 90 | 501 | 1300 | 1600 | 2070 |

TABLE 6-continued

Viscosity of the slurry as a function of storage time

| | Solids content of slurry [%] | Particle size proportion [%] | | Viscosity [mPas] | | | |
|---|---|---|---|---|---|---|---|
| | | <1 μm | <2 μm | immediately | after 1 h | after 24 h | after 168 h |
| Inventive polymer (Tab. 2, Ex. 5) | 73.0 | 98.2 | 100 | 242 | 393 | 564 | 982 |

The example shows that, when the inventive polymer is used, the lowest particle sizes and lowest viscosity can be achieved.

The invention claimed is:

1. A process for continuously preparing a polymer by free-radical solution polymerization or bulk polymerization, the process comprising:
   (a) providing at least two liquid streams, each comprising one or more of the following components, with all components being included in the at least two liquid streams:
   a free-radically polymerizable monomer,
   a regulator selected from solvents which act as regulators and regulators different therefrom, and
   an initiator,
   wherein streams comprising the initiator do not also comprise the regulator;
   (b) mixing, using at least one mixer with microstructures, said at least two liquid streams to obtain a reaction mixture, the liquid streams being mixed at least 10° C. below the reaction temperature of a subsequent polymerization of the reaction mixture; and
   (c) free-radically polymerizing the reaction mixture in at least one reaction zone.

2. The process according to claim 1, wherein the at least two liquid streams include:
   (1) at least one liquid stream which comprises at least one free-radically polymerizable monomer;
   (2) at least one liquid stream which comprises at least one initiator; and
   (3) at least one liquid stream which comprises at least one regulator.

3. The process according to claim 1, wherein the at least one reaction zone includes at least one microstructured reaction zone.

4. The process according to claim 1, the liquid streams being mixed in step (b) in at least one stage, wherein at least a last of the mixers in a flow direction before entry into the at least one reaction zone is a mixer with microstructures.

5. The process according to claim 1, wherein the product of heat transfer coefficient and volume-specific heat transfer area in the at least one reaction zone is greater than 800,000 W/m3K.

6. The process according to claim 1, wherein the polymerization in step (c) is effected in at least one stage.

7. The process according to claim 6, wherein at least one additional stream is supplied between at least two of the polymerization stages.

8. The process according to claim 7, wherein the at least one additional stream is mixed in by one or more additional mixers with microstructures.

9. The process according to claim 7, wherein at least one reactor with a mixing function is used to mix the at least one additional stream and for the further reaction.

10. The process according to claim 1, wherein the reaction discharge is subjected to an aftertreatment which is selected from postpolymerization, deodorization, neutralization, an additization different therefrom and combinations thereof.

11. The process according to claim 10, wherein at least one additive is added to the reaction discharge.

12. The process according to claim 10, wherein the aftertreatment is effected by mixing at least one additive with the reaction discharge using an additional mixer with microstructures.

13. The process according to claim 1, wherein the polymerization is effected by using as a monomer a monoethylenically unsaturated carboxylic acid or sulfonic acid or a monomer mixture which comprises at least one monoethylenically unsaturated carboxylic acid or sulfonic acid.

14. An apparatus for continuously preparing polymers, comprising:
   at least two reservoir vessels for liquid streams;
   one feed each for the liquid streams from the at least two reservoir vessels;
   one or more mixers connected in series, to which the liquid streams are supplied and mixed to obtain a reaction mixture, at least a last mixer in a flow direction before entry into one or more reaction zones being equipped with microstructures;
   at least one microstructured reaction zone, wherein microstructures within the reaction zone have a characteristic dimension in the range of from 0.1 mm to 8 mm; and
   a discharge vessel which may be equipped with one or more addition and/or mixing devices; and
   at least one further feed for a liquid stream which is arranged in the course of a reaction zone or downstream of a reaction zone.

15. The apparatus according to claim 14, wherein the discharge vessel is equipped with one or more addition and/or mixing devices.

16. The apparatus according to claim 14, comprising at least two microstructured reaction zones.

17. The apparatus according to claim 14, comprising at least one further feed for a liquid monomer stream which is arranged downstream of a reaction zone and which is followed in flow direction by at least one other reaction zone.

18. The apparatus according to claim 17, wherein the further liquid stream fed in and the discharge from the reaction zone to which the feed is connected on the downstream side are conducted into a mixer with microstructures and mixed therein.

19. The apparatus according to claim 14, comprising at least one further feed for a liquid additive stream which is arranged downstream of the last reaction zone in flow direction.

* * * * *